United States Patent
Kyoung (10) Patent No.: US 10,205,864 B2
(45) Date of Patent: Feb. 12, 2019

(54) NEAR FIELD LENS AND IMAGING APPARATUS INCLUDING SAME

(71) Applicant: SAMSUNG ELECTRONICS CO., LTD., Suwon-si (KR)

(72) Inventor: Jisoo Kyoung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 222 days.

(21) Appl. No.: 14/727,010

(22) Filed: Jun. 1, 2015

(65) Prior Publication Data

US 2015/0346477 A1    Dec. 3, 2015

(30) Foreign Application Priority Data

May 30, 2014    (KR) .................. 10-2014-0066525

(51) Int. Cl.
  *G02B 1/00*       (2006.01)
  *H04N 5/225*      (2006.01)
  *G01Q 60/22*      (2010.01)

(52) U.S. Cl.
  CPC ........... *H04N 5/2256* (2013.01); *G02B 1/002* (2013.01); *G01Q 60/22* (2013.01)

(58) Field of Classification Search
  CPC .. H04N 5/2256; G02B 1/002; G02B 27/0087; G02B 6/107; G02B 27/58; G02B 6/262; G02B 1/118; G01Q 60/22; G06K 9/00033; G06K 9/00926; G06K 2009/00953; B82Y 20/00; B82Y 35/00; G11B 7/1387
  See application file for complete search history.

(56) References Cited

U.S. PATENT DOCUMENTS

| | | | |
|---|---|---|---|
| 5,708,435 A * | 1/1998 | Kudo | H01Q 17/00 342/1 |
| 2005/0030651 A1 | 2/2005 | Sekiyama | |
| 2005/0248764 A1* | 11/2005 | Tanemura | G02B 21/365 356/417 |
| 2011/0158575 A1* | 6/2011 | Craighead | G02B 27/0087 385/3 |
| 2011/0181953 A1* | 7/2011 | Yoneda | G02B 5/3058 359/493.01 |
| 2012/0013890 A1* | 1/2012 | Watanabe | B82Y 20/00 356/51 |
| 2012/0176766 A1* | 7/2012 | Natsumeda | G02B 6/005 362/19 |

(Continued)

FOREIGN PATENT DOCUMENTS

KR    10-2011-0027543 A    3/2011

OTHER PUBLICATIONS

Silveirinha, et al.; "Tunneling of Electromagnetic Energy through Subwavelength Channels and Bends Using ε-Near Zero Materials", Physical Review Letters, vol. 97, No. 157403, Oct. 2006, 4 pages total.

(Continued)

*Primary Examiner* — Sinh Tran
*Assistant Examiner* — Tuan H Le
(74) *Attorney, Agent, or Firm* — Sughrue Mion, PLLC (57) ABSTRACT

A near field light includes a substrate; and an epsilon near zero (ENZ) material layer, which is arranged on the substrate and is formed of a material with a dielectric constant that includes a real part having a value of zero or a value very close to zero with respect to a light of a designated wavelength.

14 Claims, 10 Drawing Sheets (56) References Cited

U.S. PATENT DOCUMENTS

2014/0023321 A1* 1/2014 Lu .................. G02B 6/10
                                                    385/40
2014/0224989 A1* 8/2014 Long ................ G02F 1/0126
                                                   250/338.4

OTHER PUBLICATIONS

Adams, et al.; "Funneling Light through a Subwavelength Aperture with Epsilon-Near-Zero Materials", Physical Review Letters, vol. 107, No. 133901, Sep. 2011, 5 pages total.

Liu, et al.; "Experimental Demonstration of Electromagnetic Tunneling Through an Epsilon-Near-Zero Metamaterial at Microwave Frequencies", Physical Review Letters, vol. 100, No. 023903, Jan. 2008, 4 pages total.

Feng, et al.; "Perfect Absorption in Ultrathin Epsilon-Near-Zero Metamaterials Induced by Fast-Wave Non-Radiative Modes", Physical Review B, vol. 86, No. 165103, Dec. 2011, 4 pages total.

Vasudev, et al.; "Electro-Optical Modulation of a Silicon Waveguide with an 'Epsilon-Near-Zero' Material", Optics Express, vol. 21, No. 22, Nov. 2013, 11 pages total.

Jun, et al.; "Epsilon-Near-Zero Strong Coupling in Metamaterial-Semiconductor Hybrid Structures", Nano Letters, Oct. 2013, vol. 13, No. 11, 6 pages total.

Maas, et al.; "Experimental Realization of an Epsilon-Near-Zero Metamaterial at Visible Wavelengths", Nature Photonics, vol. 7 Oct. 2013, 6 pages total.

Campione et al.; "Electric Field Enhancement in $\varepsilon$-Near-Zero Slabs Under TM-Polarized Oblique Incidence", Physical Review, Jan. 2013, vol. 87, Issue 3, 11 pages total.

Alu, et al.; "Epsilon-Near-Zero (ENZ) Metamaterials and Electromagnetic Sources: Tailoring the Radiation Phase Pattern", Physical Review B, Apr. 2007, vol. 75, Issue 15, 15 pages total.

Edwards, et al.; "Experimental Verification of Epsilon-Near-Zero Metamaterial Coupling and Energy Squeezing Using a Microwave Waveguide", Physical Review Letters, Jan. 2008, vol. 100, Issue 3, 6 pages total.

Bak, et al.; "Super-Resolution with a Positive Epsilon Multi-Quantum-Well Super-Lens", Applied Physics Letters, Dec. 2013, vol. 103, Issue 26, 5 pages total.

Silveirinha, et al.; "Transporting an Image through a Subwavelength Hole", Physical Review Letters, Mar. 2009, vol. 102, Issue 10, 6 pages total.

Lu, et al.; "Ultracompact Electroabsorption Modulators Based on Tunable Epsilon-Near-Zero-Slot Waveguides", IEEE Photonics Journal, Jun. 2012, vol. 4, No. 3, 7 pages total.

* cited by examiner

NEAR FIELD LENS AND IMAGING APPARATUS INCLUDING SAME

CROSS-REFERENCE TO RELATED APPLICATION

This application claims priority from Korean Patent Application No. 10-2014-0066525, filed on May 30, 2014, in the Korean Intellectual Property Office, the disclosure of which is incorporated herein by reference in its entirety.

BACKGROUND

1. Field

Exemplary embodiments relate to near field lenses and imaging apparatuses including the same.

2. Description of the Related Art

Recently, following trends of technological acceleration, increasing integration, and miniaturization, demands for high sensitivity and high resolution for various measuring devices are increasing.

For example, research relating to resolving limits of resolution of optical microscopes has gained greater interest. An optical microscope for optically observing an object is unable to optically observe an object that is smaller than half a wavelength of a light irradiated onto the object.

A scattered light formed as a light collides with an object includes a near field light and a far field light. The near field light refers to a light that is unable to travel through a space and is localized on a surface of an object. A portion of a light irradiated onto an object and scattered by an object travels to a far field and forms an image via an optical lens, whereas the remaining part of the light stays near the object and disappears without transmitting any information. In case of an object smaller than about half a wavelength of a light, the major portion of a scattered light, which includes critical information for forming an image, is a near field light and stays near the object, and thus it is difficult to observe the object via an optical microscope.

Therefore, adjusting a near field light that stays near an object in order to facilitate travel thereof to a far field is the key to resolving a limit of resolution of an optical microscope.

A near field scanning optical microscopy (NSOM) equipment is widely used to embody a high resolution. A NSOM equipment scan-irradiates a near field light onto an object. The equipment is capable of scanning one point at a time, and thus there are limits to using the equipment with respect to a large area.

Furthermore, there is research relating to embodying a super lens that is capable of resolving a limit of resolution by using a meta-material. A meta-material is a material which exhibits optical properties that do not exist in nature and which has an artificial atomic structure including patterns of various shapes and subwavelength-order sizes. It is known that a meta-material may be used for subwavelength focusing with respect to electromagnetic waves, acoustic waves, and/or ultrasound waves. However, due to complicated structures, it is difficult to fabricate or utilize a meta-material.

SUMMARY

Provided are near field lenses for embodying high resolutions and imaging apparatuses including the same.

Additional aspects will be set forth in part in the description which follows and, in part, will be apparent from the description, or may be learned by practice of the presented exemplary embodiments.

According to an aspect of an exemplary embodiment, a near field light includes a substrate; and an epsilon near zero (ENZ) material layer, which is arranged on the substrate and is formed of a material with a dielectric constant that includes a real part having a value of zero or a value very close to zero, such as, for example, a value that is less than or equal to 1 with respect to a light of a predetermined wavelength.

An imaginary part of the dielectric constant of the ENZ material layer with respect to the light of the predetermined wavelength may have a value that is less than or equal to 0.5.

A thickness of the ENZ material layer may be within a range of between 10 nm and 1 μm.

The substrate may be formed of a material with a dielectric constant that is greater than 1.

The substrate may be formed of at least one from among a dielectric material and a semiconductor material.

The substrate may have a meta structure.

The ENZ material layer may include at least one from among quantum dots, dyes, $SiO_2$, $Al_2O_3$, SiN, $TiO_2$, and a doped semiconductor material.

The ENZ material layer may have a meta structure.

The ENZ material layer may have a flat panel-like shape.

According to an aspect of another exemplary embodiment, a near field imaging apparatus includes a light source configured to irradiate an object; the near field lens described above, which is configured to transmit a near field light formed as a light emitted by the light source is scattered by the object to a far field; an optical lens configured to focus a light which has propagated through the near field lens; and an image sensor configured to sense a light focused by the optical lens and to transform the focused light into electric signals.

The near field imaging apparatus may further include a stage on which the object is arranged.

An imaginary part of the dielectric constant of the ENZ material layer with respect to the light of the predetermined wavelength may have a value that is less than or equal to 0.5.

A thickness of the ENZ material layer may be within a range of between 10 nm and 1 μm.

The substrate may be formed of at least one from among a dielectric material and a semiconductor material.

The substrate may have a meta structure.

The ENZ material layer may include at least one from among quantum dots, dyes, $SiO_2$, $Al_2O_3$, SiN, $TiO_2$, and a doped semiconductor material.

The ENZ material layer may have a meta structure.

The light source may be further configured to emit a light in a mid-infrared wavelength band.

The near field imaging apparatus may further include an image processor configured to transform at least one signal received from the image sensor into at least one image signal and to display the at least one image signal.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation. In this aspect, since sizes and thicknesses of components in the drawings are arbitrarily illustrated for convenience of explanation, the following exemplary embodiments are not limited thereto.

Figure 1:
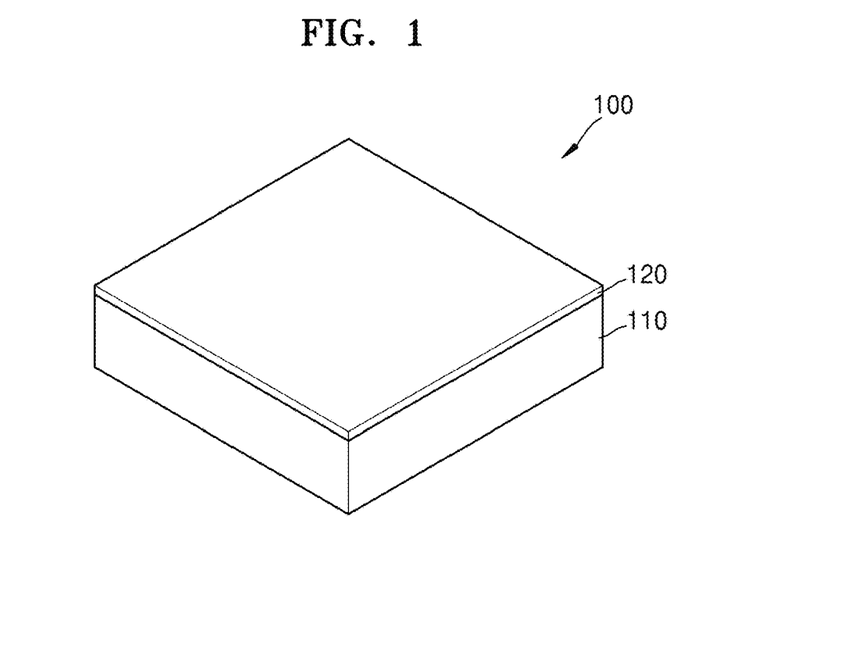
FIG. 1 is a schematic perspective view of a near field lens, according to an exemplary embodiment.

FIG. 1 is a schematic perspective view of a near field lens 100, according to an exemplary embodiment.

The near field lens 100 includes a substrate 110 and an epsilon near zero (ENZ) material layer 120.

The ENZ material layer 120 is formed of an ENZ material. An ENZ material refers to a material which has a dielectric constant that is close to zero (0), such as, for example, a material which has a dielectric constant that is less than or equal to 1. In the present specification, an ENZ material refers to a material for which a real part of a dielectric constant has a value of zero with respect to a light of a predetermined wavelength.

Mutual interactions between a light and a material, e.g., transmission, reflection, and absorption, are closely related to a refractive index n of the corresponding material. A refractive index n of a material is defined as shown below.

$$n^2 = \mu_r \epsilon_r$$

$\mu_r$ denotes a relative permeability $\mu_r$ with respect to the permeability $\mu_0$ of the vacuum, whereas $\epsilon_r$ denotes a relative permittivity $\epsilon_r$ with respect to the permittivity $\epsilon_0$ of the vacuum. $\epsilon_r$ is also referred to as a dielectric constant.

Furthermore, mutual interactions between a light and an object are also closely related to a property, that is, a wavelength of a light incident to the object, where a dielectric constant may be expressed as a function of the wavelength and as a complex number. The dielectric constant of the vacuum is 1, whereas, in the case of a general dielectric material, a real part of a dielectric constant thereof is a positive number greater than 1. In the case of a metal, a real part of a dielectric constant thereof may be a negative number. Although the real parts of dielectric constants of almost all materials have values greater than 1 in almost all wavelength bands, a real part of a dielectric constant may have a value of zero at a particular wavelength. When a real part of a dielectric constant has a value of zero or a value very close to zero, a corresponding material exhibits unique optical properties. For example, light may travel within a curved waveguide without a loss or may be squeezed into a region that is smaller than a wavelength of the light.

An exemplary embodiment provides a structure in which the ENZ material layer 120, which is formed of a material with a dielectric constant that includes a real part having a value of zero or a value very close to zero, is formed on the substrate 110 with a dielectric constant that includes a real part having a greater value, such that the structure functions as a near field lens for closely observing a near field light, which is an evanescent wave that does not travel to a far field and that is rapidly attenuated. Functions of a near field lens will be described below in detail with reference to FIGS. 4, 5, 6, 7, and 8.

The substrate 110 may be formed of a material with a dielectric constant that is greater than that of the ENZ material layer 120. For example, the substrate 110 may be formed of a material with a dielectric constant that is greater than 1. Any of various dielectric materials or semiconductor materials may be used to form the substrate 110. For example, the substrate 110 may be a silicon substrate or a glass substrate.

The substrate 110 may also have a meta structure. A meta structure may be formed as a structure which includes any of various types of conductive pattern arrays on a dielectric material. A conductive pattern array may have a size as small as a subwavelength-order size. A conductive pattern array may be formed of not only a metal, but also of any of graphene, carbon nanotube, or a conductive oxide. A meta structure is a structure which embodies optical properties not existing in nature. In the case of using a meta structure, a conductive pattern array may be designed to have a dielectric constant of a very large value or a desired value by adjusting a shape, an arrangement cycle, a size, and/or a thickness of the conductive pattern array.

The ENZ material layer 120 may be formed of a material with a dielectric constant that includes a real part having a value of zero with respect to a light of a particular wavelength, where an imaginary part of the dielectric constant of the material may also have a value which is less than or equal to about 0.5 with respect to a light of the particular wavelength.

A thickness of the ENZ material layer 120 may be within a range of between approximately 10 nanometers (nm) and approximately 1 micrometer (μm). The thickness of the ENZ material layer 120 may vary according to details of a material constituting the ENZ material layer 120. For example, as the particular wavelength at which a real part of a dielectric constant has a value of zero increases, the thickness of the ENZ material layer 120 may increase.

The ENZ material layer 120 may be formed of any of quantum dots, dyes, $SiO_2$, $Al_2O_3$, SiN, $TiO_2$, and/or a doped semiconductor material. The ENZ material layer 120 may be formed to have a flat panel-like shape. Since the property that a real part of a dielectric constant has a value of zero at a particular wavelength is used, no complicated pattern is necessary.

The ENZ material layer 120 may also be formed to have a meta structure. As described above, a meta structure may be technically designed to have a pattern for embodying a dielectric constant with a desired value.

Figure 2:
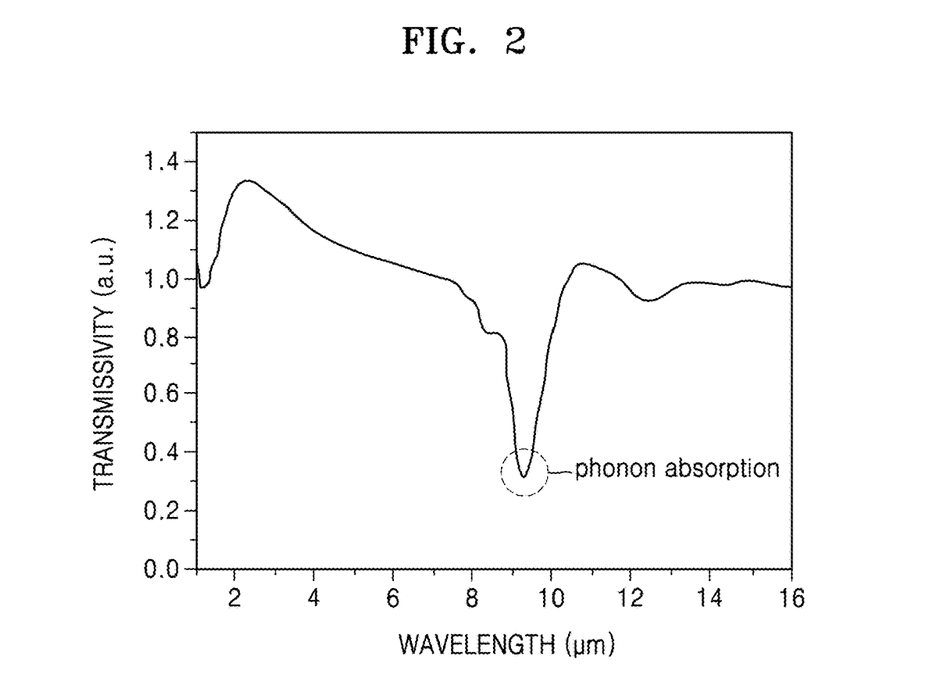
FIG. 2 is a graph showing transmissivities of $SiO_2$, which may be employed by an ENZ material layer of the near field lens of FIG. 1, according to wavelengths.
Figure 3:
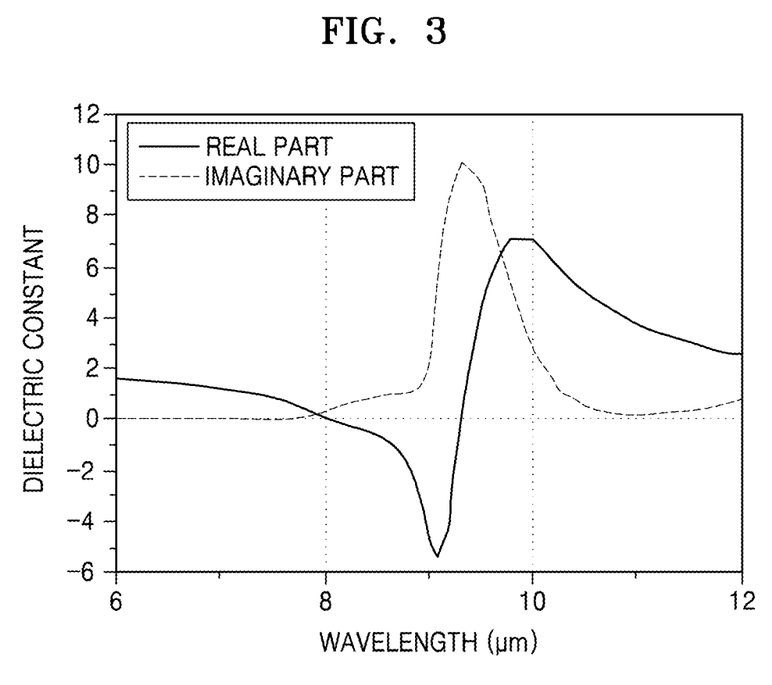
FIG. 3 is a graph showing a real part and an imaginary part of dielectric constants of $SiO_2$ according to wavelengths.

FIG. 2 is a graph showing transmissivities of $SiO_2$, which may be employed by the ENZ material layer 120 of the near field lens 100 of FIG. 1, according to wavelengths, and FIG. 3 is a graph showing a real part and an imaginary part of dielectric constant of $SiO_2$ according to wavelengths.

Referring to the graph of FIG. 2, $SiO_2$ exhibits strong phonon absorption at a wavelength of an incident light of approximately 9 μm. In this aspect, a transmissivity of $SiO_2$ is the lowest in this wavelength band.

The phenomenon may also be expressed as illustrated in the dielectric constant graph of FIG. 3. Since a real part of a dielectric constant has a minimum value at the wavelength corresponding to the phonon absorption phenomenon, the real part of the dielectric constant has a value of approximately zero at a wavelength of approximately 8 μm, which is slightly smaller than the wavelength of 9 μm. Furthermore, an imaginary part of the dielectric constant has a very small value that is close to zero at the wavelength of approximately 8 μm. Therefore, $SiO_2$ is an ENZ material exhibiting unique optical properties in a vicinity of the wavelength of 8 μm.

Almost all dielectric materials have similar properties as shown in the graphs of FIGS. 2 and 3. For example, real parts of dielectric constants of $Al_2O_3$ and SiN have values that are close to zero with respect to a light of a wavelength of approximately 11 μm, and a real part of a dielectric constant of $TiO_2$ has a value close to zero with respect to a light of a wavelength of approximately 12.5 μm.

Furthermore, a semiconductor material may exhibit such properties based on a doping concentration.

If a semiconductor is densely doped with an impurity, free electrons are plasmerized, where a dielectric constant of the doped semiconductor follows the Drude model and may be expressed as shown below.

$$\epsilon(\omega) = \epsilon_\infty \left(1 - \frac{\omega_p^2}{\omega^2 + i\omega\Gamma}\right), \quad \omega_p^2 = \frac{ne^2}{m^*\epsilon_o\epsilon_\infty},$$

Here, $\omega$ denotes a frequency, $\Gamma$ denotes an attenuation constant, $\omega_p$ denotes a plasma frequency of a semiconductor, n denotes a carrier concentration, and $m^*$ denotes an effective mass.

When a real part and an imaginary part of the dielectric constant are plotted on a graph, the real part of the dielectric constant is changed from a positive number to a negative number as a wavelength increases. In particular, a semiconductor material that is densely doped with an impurity may be changed from an insulator to a conductor according to wavelengths, where a wavelength point at which the semiconductor material becomes an ENZ material is formed between wavelengths at which the semiconductor material is an insulator and wavelengths at which the semiconductor is a conductor.

Figure 4:
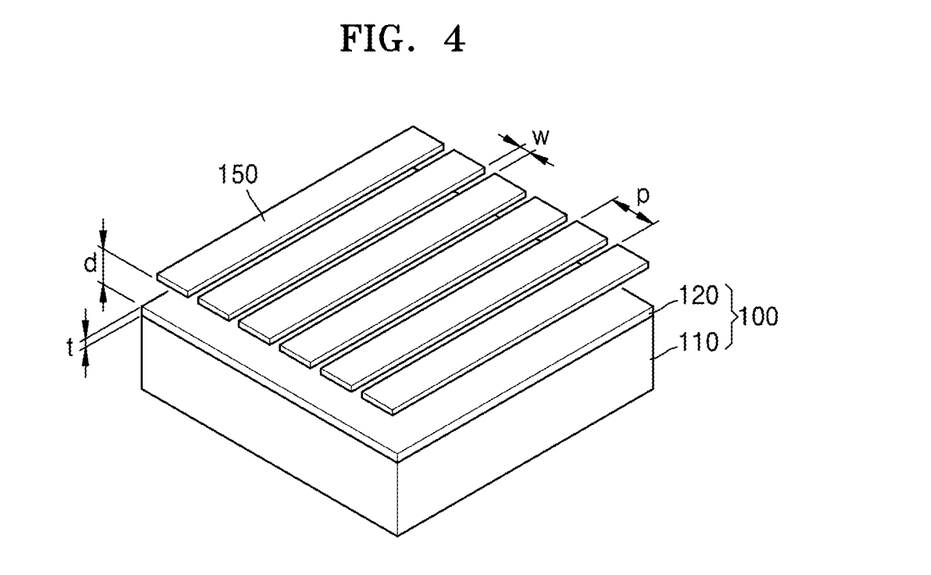
FIG. 4 is a diagram showing a structure configured for testing a performance of the near field lens, the structure including a metal slit that is arranged above the near field lens.

FIG. 4 is a diagram showing a structure configured for testing a performance of the near field lens 100, the structure including a metal slit 150 that is arranged above the near field lens 100.

In the metal slit 150, stripe-like slits having a width w are repeatedly formed at a spatial period p. A distance between the metal slit 150 and the near field lens 100 is d. A light of a wavelength longer than the slit width w may not easily be transmitted through the metal slit 150. In particular, a light transmitted through the metal slit 150 becomes a near field light having an evanescent wave property.

If the near field lens 100 according to the present exemplary embodiment is arranged close to the metal slit 150, a near field light may be transmitted to a far field by the near field lens 100, and thus a form of the near field light may be closely observed.

In the graphs below, the near field lens 100 includes the substrate 110 formed of Si and the ENZ material layer 120 formed of $SiO_2$. Furthermore, a width w of the metal slit 150 is 500 nm, a period p is 4.5 μm, and a distance d between the metal slit 150 and the near field lens 100 and a thickness t of the ENZ material layer 120 are varied.

Figure 5:
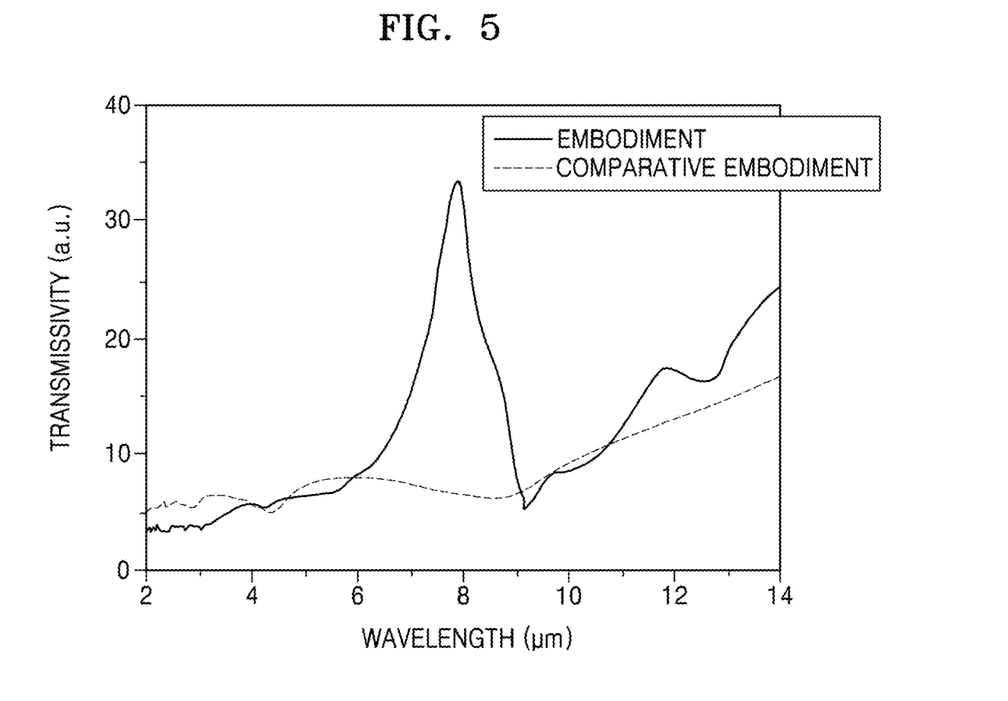
FIG. 5 is a graph showing a case in which transmissivities according to wavelengths of incident lights are measured via the near field lens and a case in which transmissivities according to wavelengths of incident lights are measured without a near field lens.

FIG. 5 is a graph showing a case in which transmissivities according to wavelengths of incident lights are measured via the near field lens 100 and a case in which transmissivities according to wavelengths of incident lights are measured without a near field lens.

In the graph of FIG. 5, the case in which transmissivities according to wavelengths of incident lights are measured via the near field lens 100 is indicated as an embodiment, whereas the case in which transmissivities according to wavelengths of incident lights are measured without a near field lens is indicated as a comparative embodiment.

Referring to the graph of FIG. 5, transmissivities less than or equal to 10% are shown with respect to lights of all wavelength bands in the comparative embodiment, whereas transmissivities show the peak value with respect to a light of the wavelength of 8 µm in the embodiment.

The wavelength of 8 µm is the wavelength at which a SiO$_2$ material employed by the near field lens 100 exhibits the ENZ property. In particular, when the ENZ material layer 120 of the near field lens 100 employs a SiO$_2$ material, a near field light formed from a light of the wavelength of 8 µm may be closely observed via the near field lens 100.

The graph shown in FIG. 5 relates to a case in which a distance d between the metal slit 150 and the near field lens 100 is zero. Based on the distance d, performance of the near field lens 100 may slightly vary.

Figure 6:
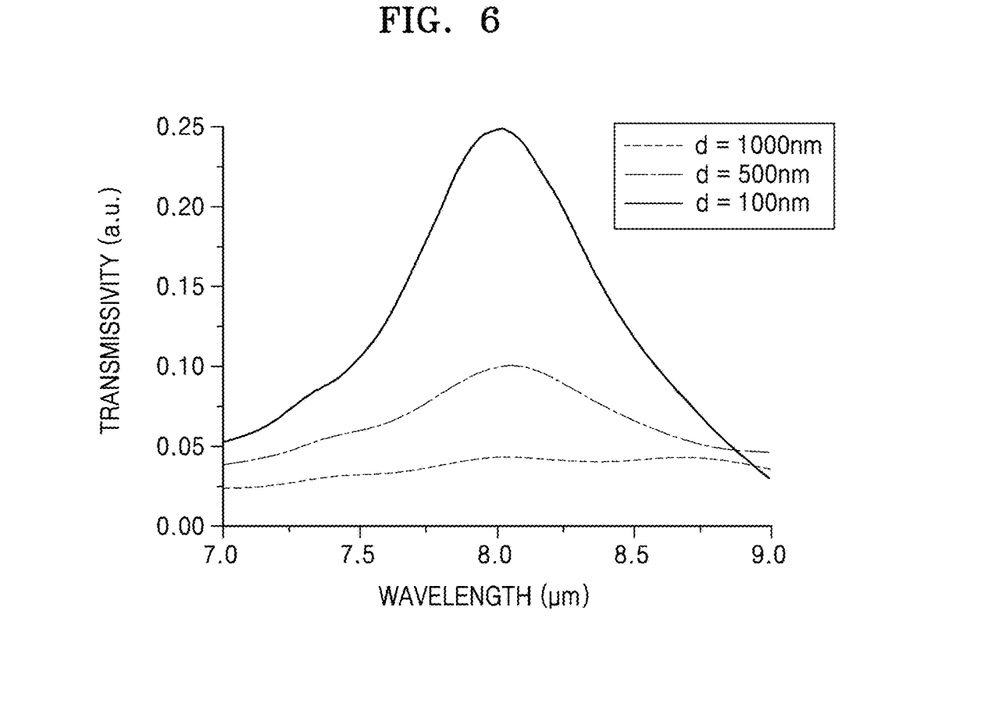
FIG. 6 is a graph showing transmissivities according to wavelengths of lights incident to the metal slit when distances between the near field lens and the metal slit are 100 nm, 500 nm, and 1000 nm, respectively.

FIG. 6 is a graph showing transmissivities according to wavelengths of lights incident to the metal slit 150 when distances d between the near field lens 100 and the metal slit 150 are 100 nm, 500 nm, and 1000 nm, respectively.

Referring to the graph of FIG. 6, a peak of transmissivities appears in the wavelength band around 8 µm. As the distance d increases, the transmissivity at the peak location decreases.

Figure 7:
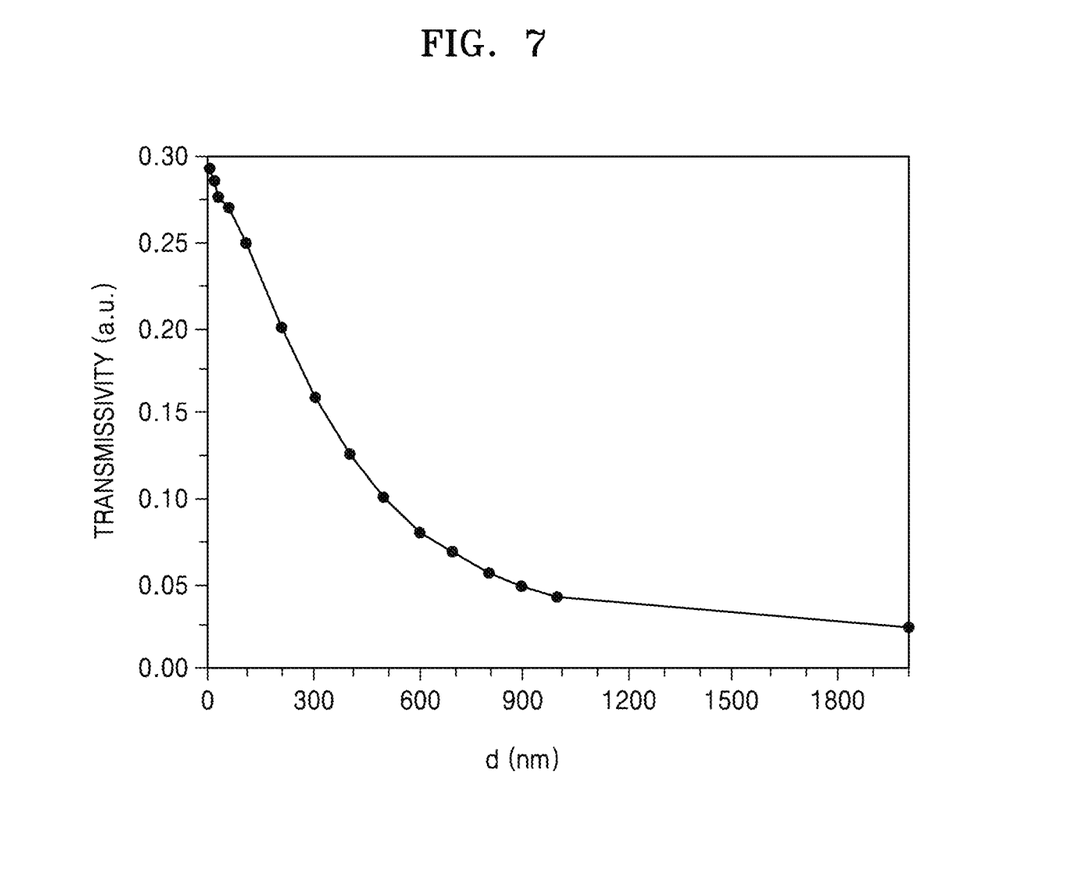
FIG. 7 is a graph showing transmissivities of lights incident to the metal slit according to distances between the near field lens and the metal slit, according to an exemplary embodiment.

FIG. 7 is a graph showing transmissivities of lights incident to the metal slit 150 according to distances between the near field lens 100 and the metal slit 150, according to an exemplary embodiment.

A light of the wavelength of 8 µm is incident to the metal slit 150, where transmissivities decrease as the distance between the near field lens 100 and the metal slit 150 increases.

Referring to FIGS. 6 and 7, a distance between the near field lens 100 and the metal slit 150, that is, a distance between the near field lens 100 and an object, which is a target object to be observed, may be within a suitable range. For example, the distance between the near field lens 100 and the metal slit 150 may be within 2 µm, may preferably be 0.5 µm, and may also be 0. However, the range may vary according to a material constituting the ENZ material layer 120 of the near field lens 100.

Figure 8:
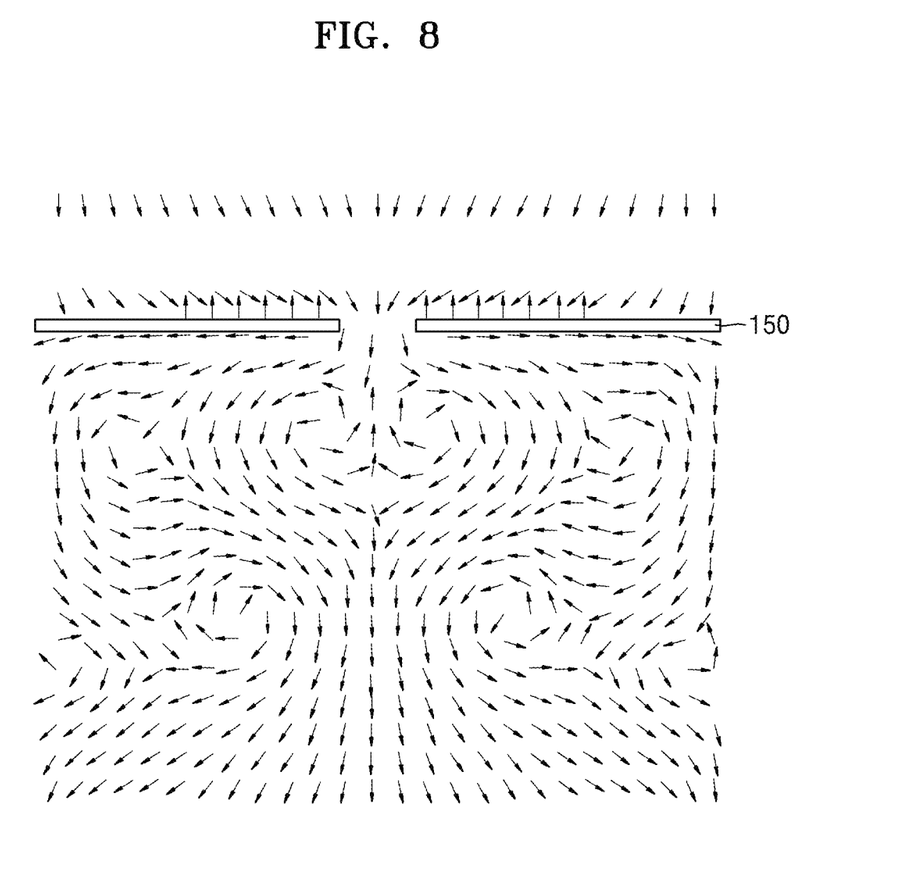
FIG. 8 is a diagram showing a power flow relating to a path via which a light that has propagated through the metal slit travels, according to a comparative exemplary embodiment without a near field lens.

The power flow illustrated in FIG. 8 clearly shows that the near field lens 100 is capable of transmitting a near field light to a far field.

FIG. 8 is a diagram showing a power flow relating to a path via which a light that has propagated through the metal slit 150 travels, according to a comparative embodiment without a near field lens.

Referring to flow of a light that has propagated through the metal slit 150, most of the light is localized in the form of a vortex.

Figure 9:
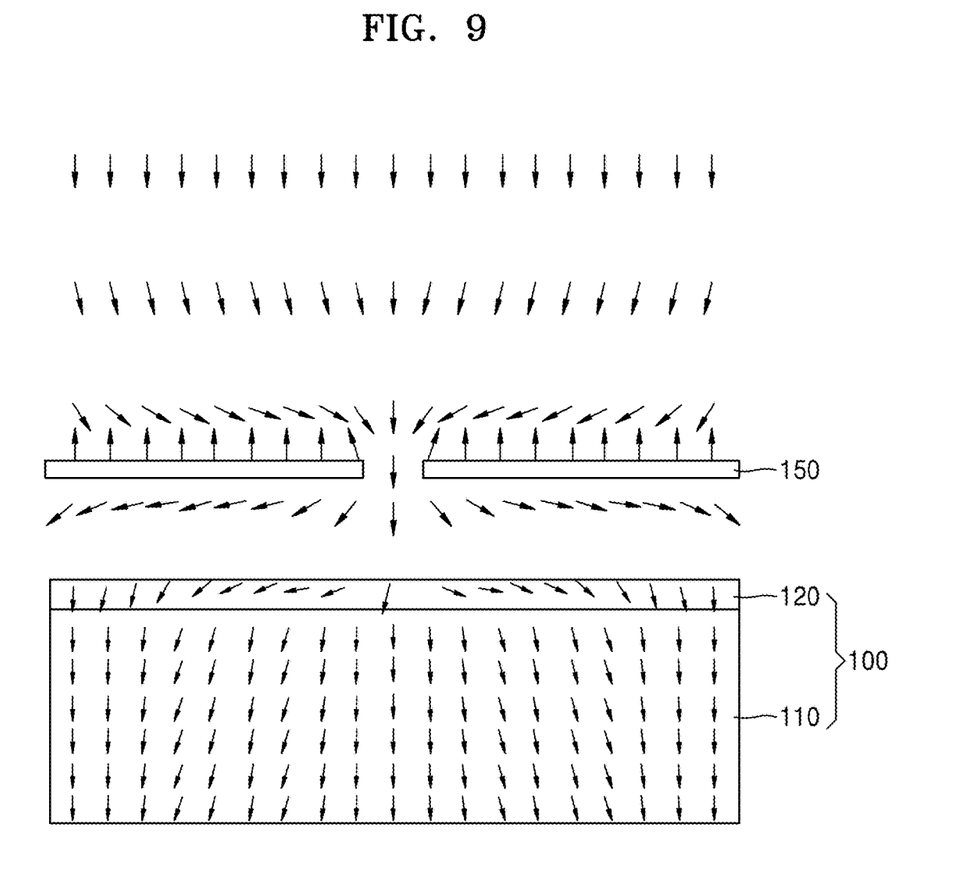
FIG. 9 is a diagram showing a power flow relating to a path via which a light that has propagated through the metal slit travels through the near field lens, according to an exemplary embodiment.

FIG. 9 is a diagram showing a power flow relating to a path via which a light that has propagated through the metal slit 150 travels through the near field lens 100, according to an exemplary embodiment.

Referring to the graph of FIG. 9, if the near field lens 100 is arranged, a vortex of a light flow as shown in the graph of FIG. 7 is not formed, and the light travels through the near field lens 100 to a far field.

Figure 10:
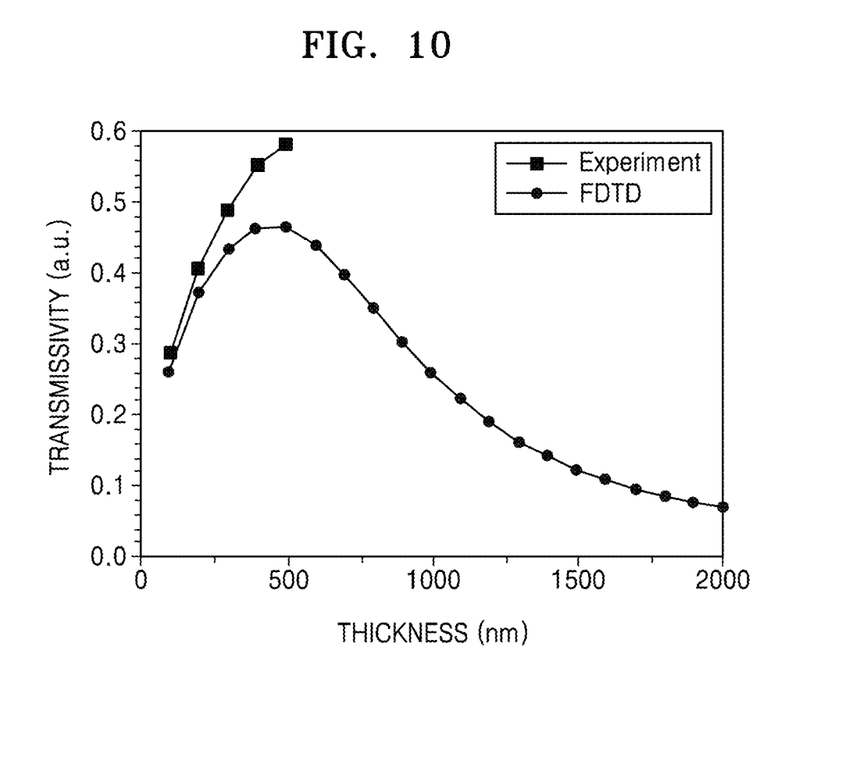
FIG. 10 is a graph showing transmissivities of a light incident to the metal slit based on thicknesses of the ENZ material layer of the near field lens, according to an exemplary embodiment.

FIG. 10 is a graph showing transmissivities of a light incident to the metal slit 150 based on thicknesses of the ENZ material layer 120 of the near field lens 100, according to an exemplary embodiment.

The graph of FIG. 10 shows a result of a finite-difference time-domain (FDTD)-based computer simulation and a result of an experiment together. A distance between the near field lens 100 and the metal slit 150 was zero. As thickness of the ENZ material layer 120 increased, transmissivities initially increased and then decreased. Therefore, an amount of a near field light to be obtained may be controlled by adjusting the thickness of the ENZ material layer 120. The transmissivity affects a resolution. In particular, more near field light may be obtained as transmissivity increases, and thus clarity increases. However, if the thickness of the ENZ material layer 120 is excessive, transmissivity decreases, because of a loss which corresponds to an imaginary part of a dielectric constant of an ENZ material.

Figure 11:
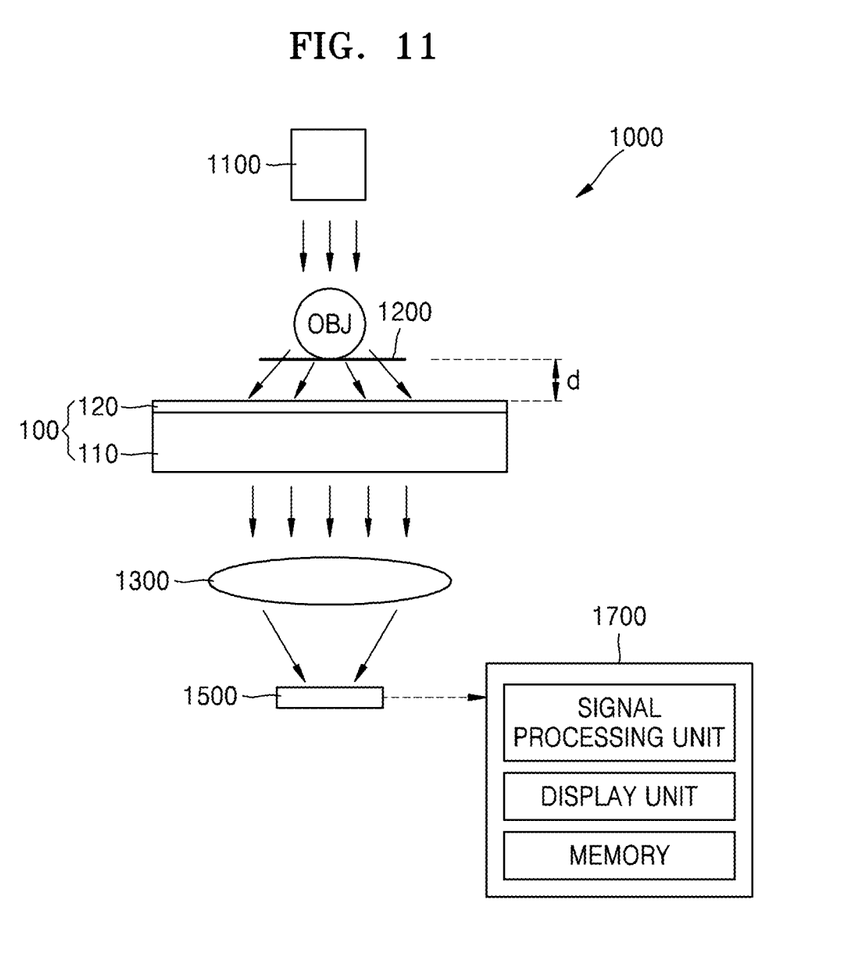
FIG. 11 is a schematic diagram showing a configuration of a near field imaging apparatus, according to an exemplary embodiment.

FIG. 11 is a schematic diagram showing the configuration of a near field imaging apparatus 1000, according to an exemplary embodiment.

The near field imaging apparatus 1000 includes a light source 1100 which is configured for emitting a light to an target object OBJ, a near field lens 100 which is configured for transmitting a near field light, which is formed as a light emitted by the light source 1100 is scattered by the target object OBJ, to a far field, an optical lens 1300 which is configured for focusing a light that has propagated through the near field lens 100, and an image sensor 1500 which is configured for sensing a light focused by the optical lens 1300 and for transforming the sensed light into electric signals.

The near field lens 100 includes a substrate 110 and an ENZ material layer 120 formed on the substrate 110. The substrate 110 may be formed of a material which has a dielectric constant that is greater than 1 and which may include any of various dielectric materials or semiconductor materials. Furthermore, the substrate 110 may have a meta structure. The ENZ material layer 120 is formed of a material for which a real part of a dielectric constant has a value of zero with respect to a light of a designated wavelength. The ENZ material layer 120 may include any of quantum dots, dyes, SiO$_2$, Al$_2$O$_3$, SiN, TiO$_2$, and/or a doped semiconductor material and may also have a meta structure.

The light source 1100 is configured to emit lights of wavelengths in a wavelength band which is appropriate to a performance of the near field lens 100. The light source 1100 may be configured to emit lights of wavelengths in a wavelength band which includes the particular wavelength at which a real part of a dielectric constant of the ENZ material layer 120 has a value of zero or approximately zero (i.e., less than 1). For example, the light source 1100 may be configured to emit lights in the mid-infrared (mid-IR) range. However, the exemplary embodiments are not limited thereto, and a light sources emitting lights of other bands, such as any one of a visible ray band, a near IR band, a terahertz wave band, and a microwave band, may be used based on characteristics of the ENZ material layer 120. The light source 1100 may include a light source, such as any of a laser diode (LD), a light emitting diode (LED), and a super luminescent diode (SLD).

A band pass filter may be further arranged between the light source 1100 and the target object OBJ. Furthermore, any one or more of various optical elements for directing a light emitted by the light source 1100 toward the target object OBJ may be further arranged between the light source 1100 and the target object OBJ.

Furthermore, the near field imaging apparatus 1000 may further include a stage 1200 on which the target object OBJ is arranged and/or positioned, where a configuration for adjusting a distance d between the stage 1200 and the near field lens 100 may be employed. For example, the stage 1200 may be arranged, such that a distance d between the target object OBJ and the near field lens 100 may be adjusted within a range of between 0 µm and 2 µm.

The optical lens 1300 focuses a light that has propagated through the near field lens 100 on the image sensor 1500.

Although the optical lens 1300 is shown as a single lens, it is merely an example, and the optical lens 1300 may include a plurality of lenses.

The image sensor 1500 transforms a light focused by the optical lens 1300 into electric signals and may be a charge coupled device (CCD) image sensor or a complementary metal-oxide-semiconductor (CMOS) image sensor, for example.

Furthermore, the near field imaging apparatus 1000 may further include an image processing unit (also referred to herein as an "image processor") 1700 which is configured for processing signals received from the image sensor 1500 into image signals. For example, the image processing unit 1700 may include a signal processing unit (also referred to herein as a "signal processor") which is configured for transforming signals received from the image sensor 1500 into image signals, a display unit (also referred to herein as a "display device" and/or as a "display") which is configured for displaying an image based on image signals, and a memory which is configured for storing image data formed by the signal processing unit.

A light emitted by the light source 1100 to the target object OBJ and scattered by the target object OBJ includes various information which relates to the target object OBJ. Most of a light scattered by the target object OBJ including a near field light may be sensed by the image sensor 1500 via the near field lens 100. Therefore, the near field imaging apparatus 1000 according to an exemplary embodiment may image the target object OBJ at a high resolution.

Figure 12A:
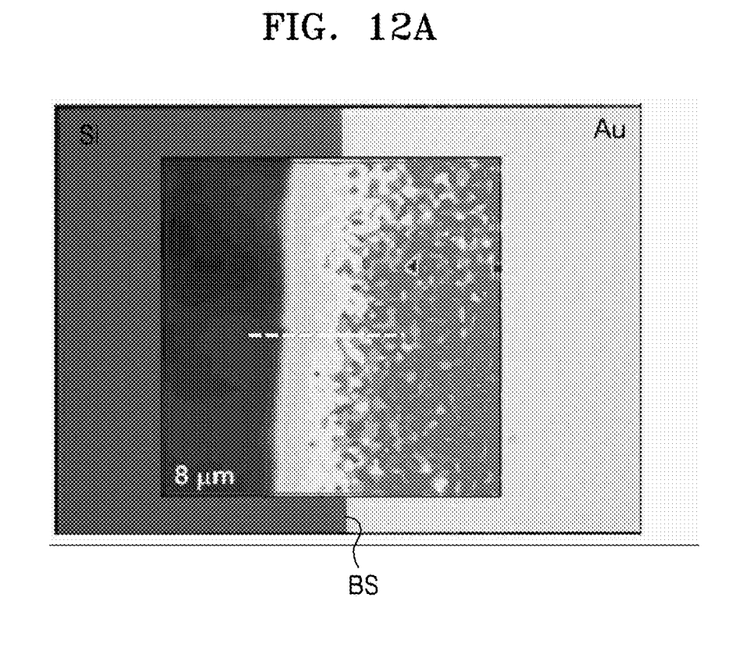
FIG. 12A is a picture showing a side of a metal imaged by using the near field imaging apparatus according to an exemplary embodiment.
Figure 12B:
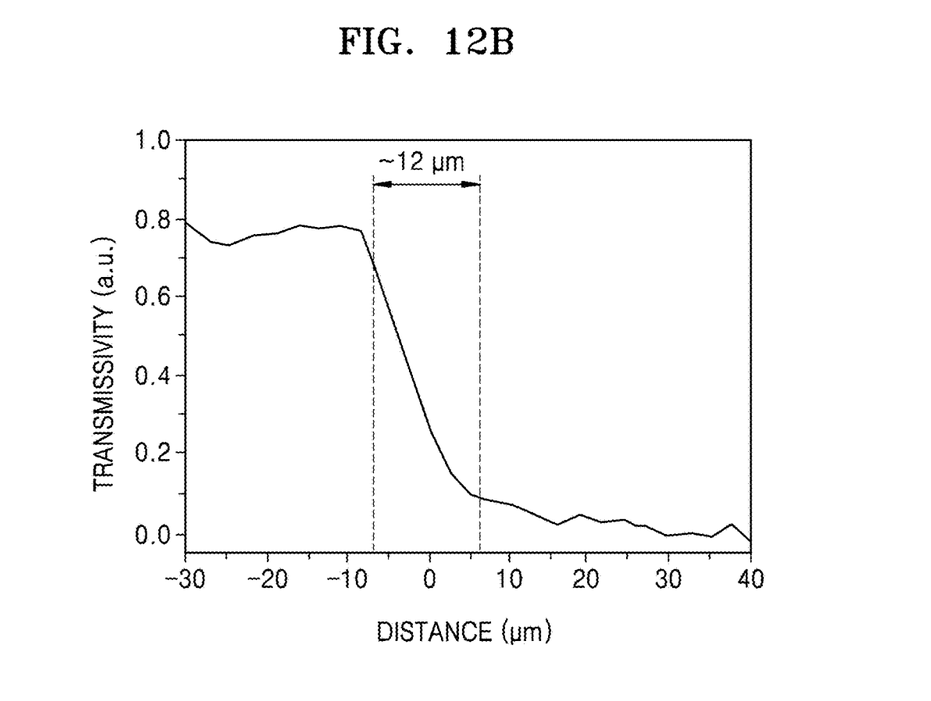
FIG. 12B is a graph showing transmissivities along the broken line of FIG. 12A.

FIG. 12A is an picture showing a side of a metal imaged by using the near field imaging apparatus 1000 according to an exemplary embodiment, and FIG. 12B is a graph showing transmissivities along the broken line of FIG. 12A.

Figure 13A:
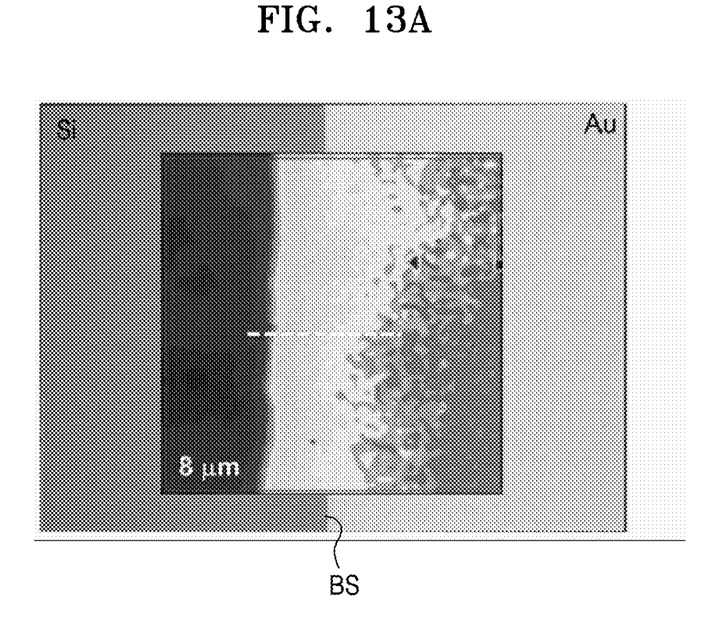
FIG. 13A is a picture of a side of a metal imaged by using an imaging apparatus according to a comparative exemplary embodiment.
Figure 13B:
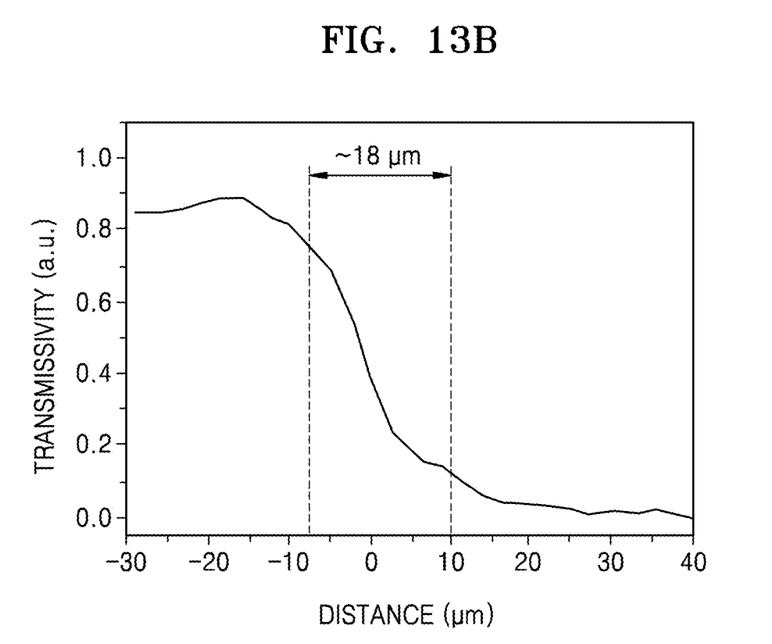
FIG. 13B is a graph showing transmissivities along the broken line of FIG. 13A.

Furthermore, FIG. 13A is a picture showing a side of a metal imaged by using an imaging apparatus according to a comparative embodiment, and FIG. 13B is a graph showing transmissivities along the broken line of FIG. 13A.

The imaging apparatus according to the comparative embodiment has a structure in which a silicon substrate without the ENZ material layer 120 is arranged at a location corresponding to the near field lens 100 in the near field imaging apparatus 1000 of FIG. 11.

The pictures 12A and 13A show a portion of a region which includes a boundary surface (BS) between gold (Au) and silicon (Si), where resolutions of the respective apparatuses may be confirmed from the graphs of FIGS. 12B and 13B in which transmissivities are shown along the broken lines. The resolution are distances at which transmissivities are changed from 90% the maximum value to 10% the maximum value, where the respective resolutions are 12 μm and 18 μm. In this aspect, the near field imaging apparatus 1000 according to an exemplary embodiment has superior resolution than the imaging apparatus according to the comparative embodiment.

The near field lens may be configured to transmit a near field light to a far field and has a very simple structure.

Since the near field imaging apparatus employs the near field lens, most of a light scattered by an object, which includes a near field light, may be sensed by an image sensor, and thus the near field imaging apparatus may image the object at a high resolution. Furthermore, the near field imaging apparatus is capable of imaging an object of a subwavelength-order size.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A near field imaging apparatus comprising:
   a near field lens comprising:
      a substrate; and
      an epsilon near zero (ENZ) material layer, which is arranged on the substrate and is formed of a material with a dielectric constant that includes a real part having an absolute value that is less than 1 with respect to a light of a predetermined wavelength, and
   a stage on which an object is to be disposed, the stage being configured to adjust a distance between the ENZ material layer and the stage so that the near field lens has a transmissivity within a predetermined range.

2. The near field imaging apparatus of claim 1, wherein an imaginary part of the dielectric constant of the ENZ material layer with respect to the light of the predetermined wavelength has a value that is less than or equal to 0.5.

3. The near field imaging apparatus of claim 1, wherein a thickness of the ENZ material layer is within a range of between 10 nanometers (nm) and 1 micrometer (μm).

4. The near field imaging apparatus of claim 1, wherein the substrate is formed of a material with a dielectric constant that is greater than 1.

5. The near field imaging apparatus of claim 1, wherein the substrate is formed of at least one from among a dielectric material and a semiconductor material.

6. The near field imaging apparatus of claim 1, wherein the substrate has a meta structure.

7. The near field imaging apparatus of claim 1, wherein the ENZ material layer comprises at least one from among quantum dots, dyes, $SiO_2$, $Al_2O_3$, SiN, $TiO_2$, and a doped semiconductor material.

8. The near field imaging apparatus of claim 1, wherein the ENZ material layer has a meta structure.

9. The near field imaging apparatus of claim 1, wherein the ENZ material layer has a flat panel-like shape.

10. The near field imaging apparatus of claim 1, further comprising:
    a light source configured to emit the light to the object;
    an optical lens configured to focus the light which has propagated through the near field lens; and
    an image sensor configured to sense the light focused by the optical lens in order to facilitate a conversion thereof to electric signals.

11. The near field imaging apparatus of claim 10, wherein the light emitted from the light source is in a mid-infrared wavelength band.

12. The near field imaging apparatus of claim 10, further comprising an image processor configured to transform at least one signal received from the image sensor into at least one image signal and to display the at least one image signal.

13. The near field imaging apparatus of claim 1, wherein the stage is further configured to adjust the distance between the ENZ material layer and the stage to be within a distance range between 0 μm and 2 μm.

14. The near field lens of claim 1, wherein the ENZ material layer is formed of a material with a dielectric constant that includes a real part having an absolute value of 0 with respect to the light of the predetermined wavelength.

* * * * *